United States Patent
Smith

(10) Patent No.: US 10,549,671 B1
(45) Date of Patent: Feb. 4, 2020

(54) SEAT LOCKING SYSTEM

(71) Applicant: Faurecia Automotive Seating, LLC, Auburn Hills, MI (US)

(72) Inventor: James S. Smith, Troy, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/142,381

(22) Filed: Sep. 26, 2018

(51) Int. Cl.
*B60N 2/90* (2018.01)
*B60N 2/30* (2006.01)

(52) U.S. Cl.
CPC .......... *B60N 2/938* (2018.02); *B60N 2/309* (2013.01); *B60N 2/3031* (2013.01); *B60N 2/3065* (2013.01); *B60N 2002/971* (2018.02)

(58) Field of Classification Search
CPC .... B60N 2/938; B60N 2/3031; B60N 2/3065; B60N 2/309
See application file for complete search history.

(56) References Cited

U.S. PATENT DOCUMENTS

| | | | |
|---|---|---|---|
| 6,863,330 B2 * | 3/2005 | Yokoyama | B60N 2/01541 248/503.1 |
| 6,910,739 B2 | 6/2005 | Grable | |
| 7,393,056 B2 | 7/2008 | O'Connor | |
| 9,114,732 B2 | 8/2015 | Cooley | |
| 9,126,503 B2 * | 9/2015 | Ito | B60N 2/3065 |
| 9,156,381 B2 | 10/2015 | Seigel | |
| 9,283,873 B2 * | 3/2016 | Line | B60N 2/3065 |

FOREIGN PATENT DOCUMENTS

CN       204978301 U       1/2016

\* cited by examiner

*Primary Examiner* — Anthony D Barfield
(74) *Attorney, Agent, or Firm* — Barnes & Thornburg LLP

(57) ABSTRACT

A seat locking system for selectively locking a pivotable seat in a retracted position and in an extended position. The seat locking system includes a lock and a pivotable locking pawl adapted to selectively engage the lock.

13 Claims, 4 Drawing Sheets

US 10,549,671 B1

SEAT LOCKING SYSTEM

BACKGROUND

The present disclosure relates to a seat locking system for a vehicle seat. In particular, the present disclosure relates to a seat locking system for releasably locking the vehicle seat in a retracted position and for releasably locking the vehicle seat in an extended position.

SUMMARY

According to the present disclosure, a seat locking system includes a lock and a locking pawl adapted to releasably engage the lock. The seat locking system is adapted to allow a seat to be selectively pivoted between a retracted position and an extended position and to releasably lock the seat in the retracted position and releasably lock the seat in the extended position.

In illustrative embodiments, the lock may include a catch adapted to be engaged by an abutment member of the locking pawl to releasably lock the seat in the retracted position. The lock may also include a retention member adapted to be engaged by a latch member of the locking pawl to releasably lock the seat in the extended position. The locking pawl is selectively pivotable between a locked position an unlocked position wherein the seat is selectively pivotable between the retracted position and the extended position of the seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 1:
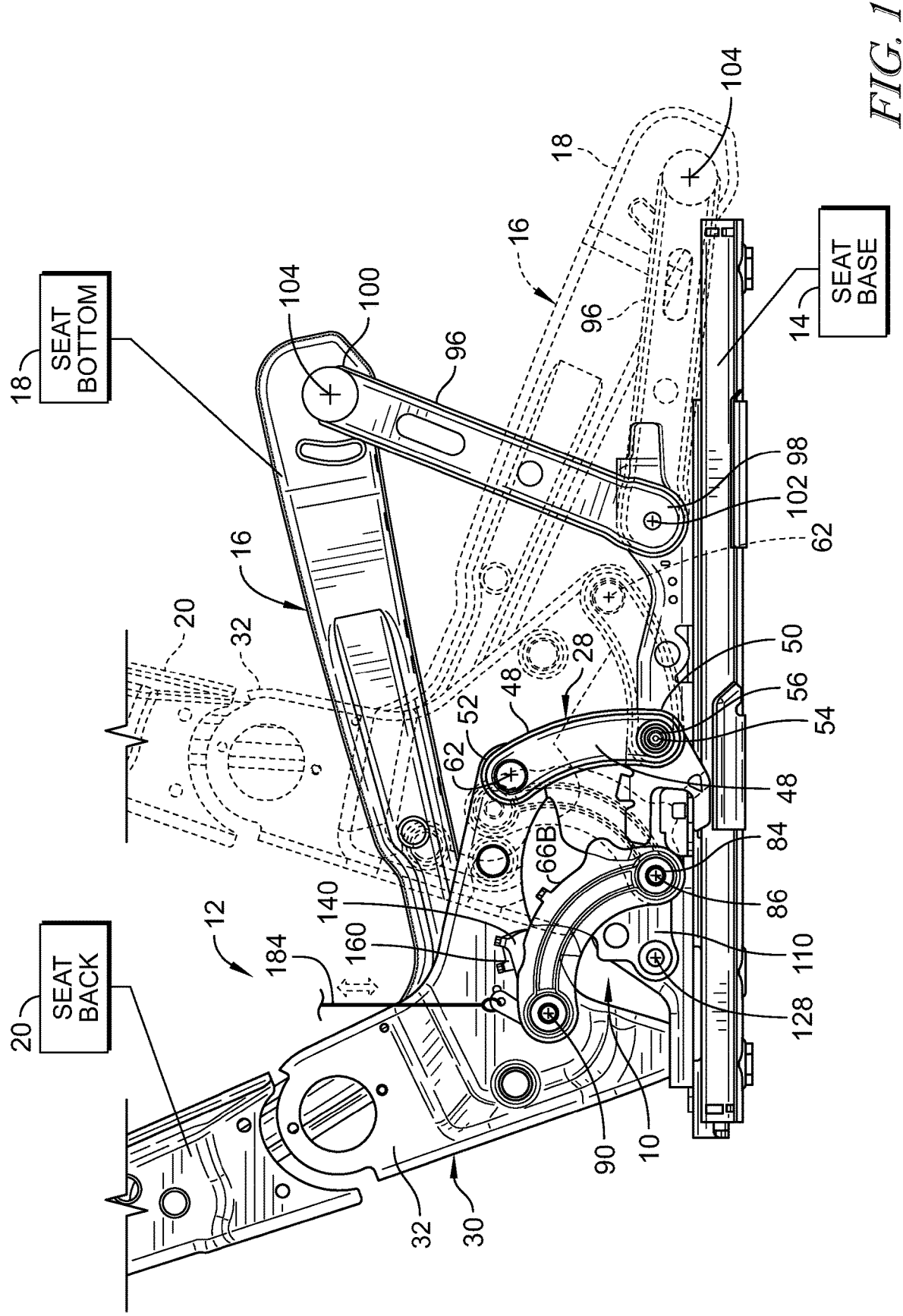
Figure 2:
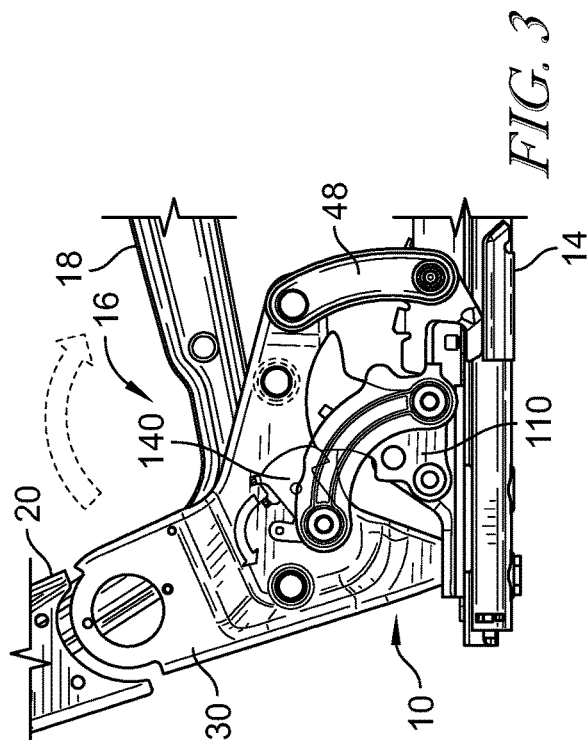
Figure 3:
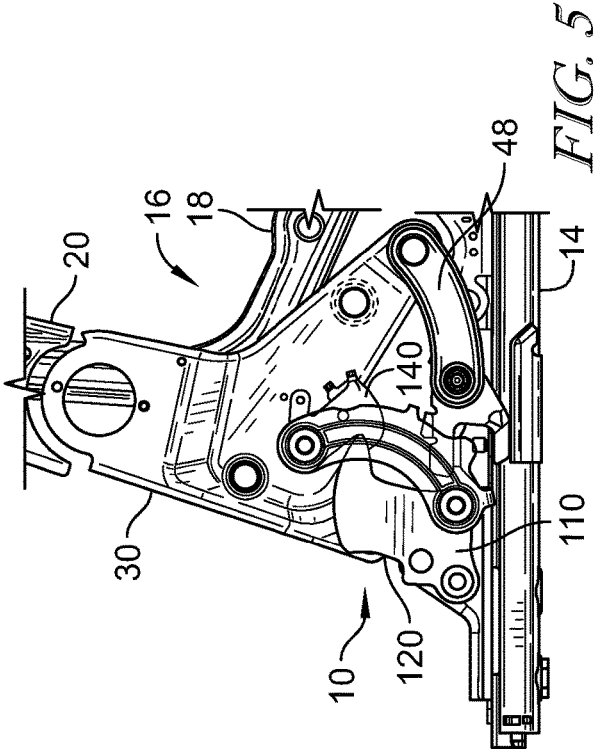
Figure 4:
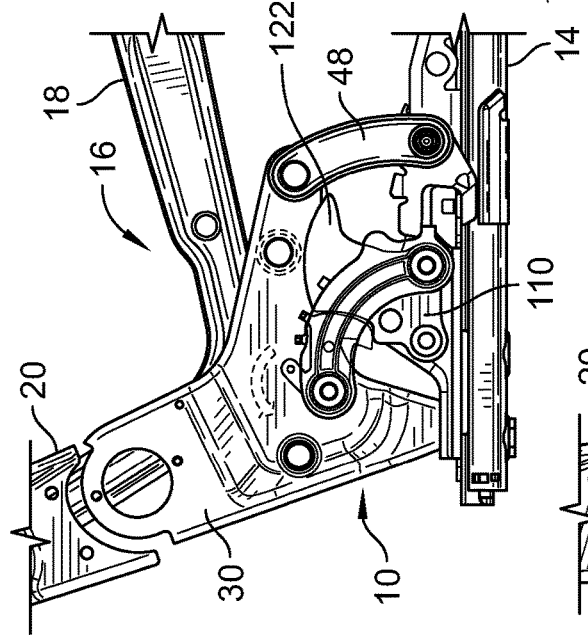
Figure 5:
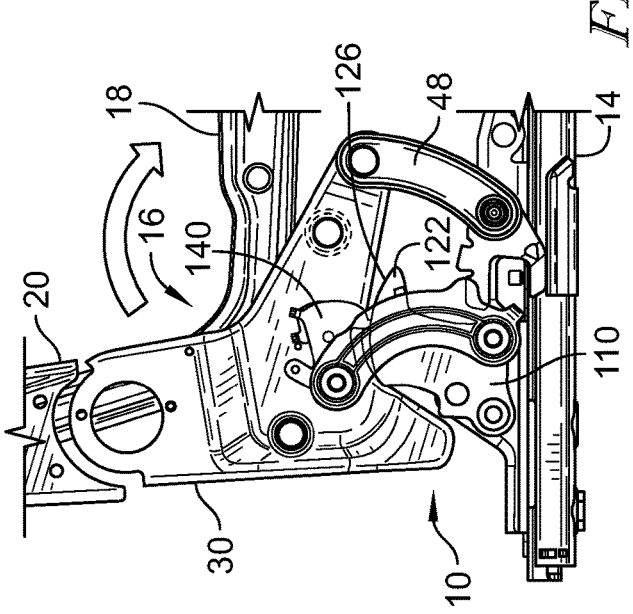
Figure 6:
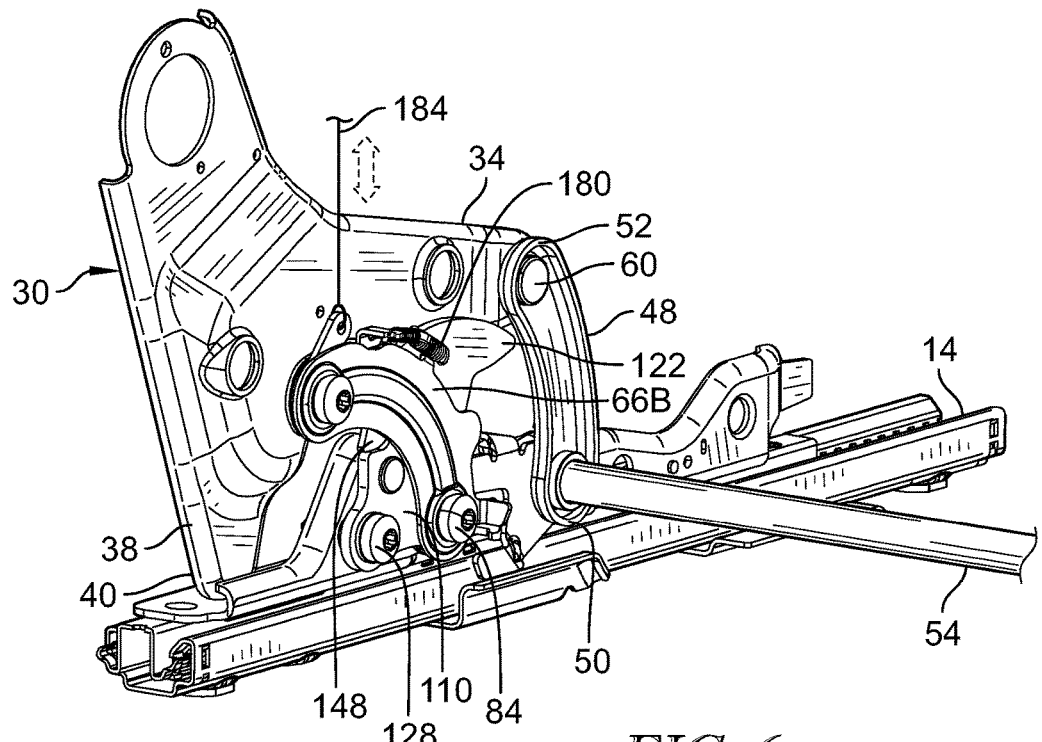
Figure 7:
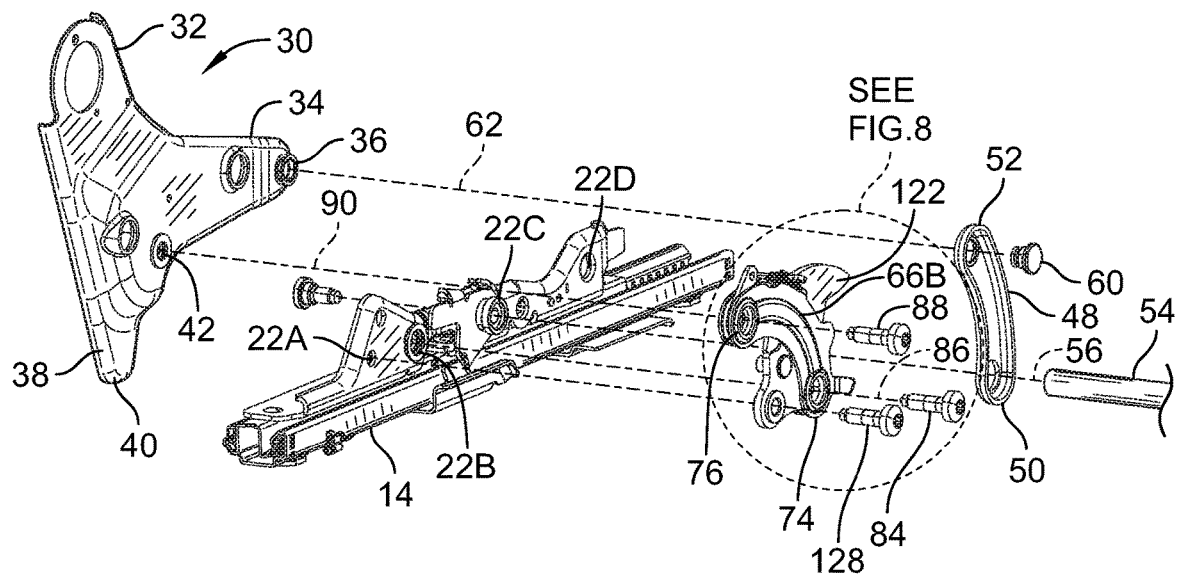
Figure 8:
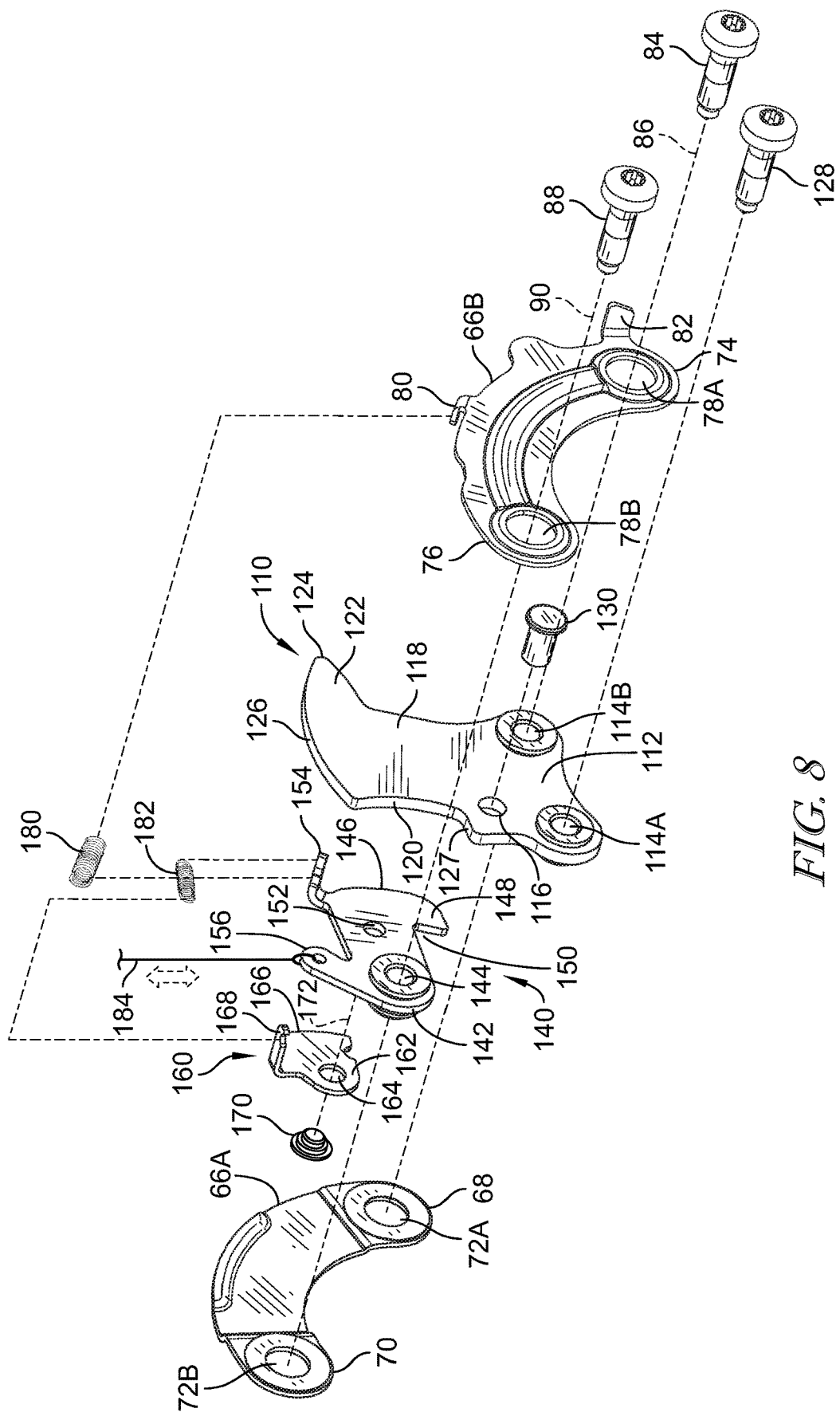

The detailed description particularly refers to the accompanying figures in which:

FIG. 1 is a side elevational view of the seat locking system in accordance with the present disclosure shown in connection with a vehicle seat having a seat pivotably coupled to a seat base, with the seat shown in a retracted position in solid lines and with the seat shown pivoted to an extended position in dashed lines, FIGS. 2-5 are a series of views showing the process for pivotably moving the seat from the retracted position as shown in FIG. 2 to the extended position as shown in FIG. 5, FIG. 6 is a perspective view of the seat locking system and a linkage system thereof for pivotably coupling the seat of the vehicle seat to the seat base, FIG. 7 is an exploded view of the seat locking system and linkage assembly as shown in FIG. 6, FIG. 8 is an exploded view of a portion of the seat locking system as designated in FIG. 7.

DETAILED DESCRIPTION

A seat locking system 10, in accordance with the present disclosure, is adapted to selectively lock a pivotable vehicle seat 12 to prevent pivotable movement of vehicle seat 12 and to selectively unlock vehicle seat 12 to allow pivotable movement of vehicle seat 12. Vehicle seat 12 includes a seat base 14 adapted to be secured to the floor of a vehicle. Vehicle seat 12 includes a seat 16 having a seat bottom 18 and a seat back 20 that extends generally upwardly from a rear end of seat bottom 18. Seat 16 is pivotably coupled to seat base 14 and is selectively pivotable with respect to seat base 14 between a retracted position as generally shown in solid lines in FIG. 1 and an extended position as generally shown in dashed lines in FIG. 1. Seat 16 is adapted to receive and support an occupant when seat 16 is in the retracted position. Seat 16 is selectively pivotable to the extended position to provide additional access by a user or occupant to the area behind seat 16. Seat locking system 10 releasably locks seat 16 in the retracted position with respect to seat base 14 and releasably locks seat 16 in the extended position with respect to seat base 14, while allowing seat 16 to be selectively moved between the retracted position and the extended positon. Seat base 14 includes spaced apart apertures 22A-D that extend generally transversely into seat base 14.

Seat locking system 10 includes a linkage system 28 for pivotably coupling seat 16 to seat base 14. Linkage system 28 includes a pivot bracket 30 rigidly coupled to seat 16. Pivot bracket 30 includes an upper leg 32 having a top end, a forwardly extending front leg 34 having an outer end including an aperture 36, and a downwardly extending rear leg 38 having a tip 40. Pivot bracket 30 also includes an aperture 42. Tip 40 of pivot bracket 30 is adapted to engage seat base 14 when seat 16 is in the retracted position.

Linkage system 28 includes a front pivot link 48 having a first end 50 and a spaced apart second end 52. First end 50 of front pivot link 48 is pivotably coupled to seat base 14 by a fastener 54 that extends through an aperture in first end 50 of front pivot link 48 and into aperture 22C of seat base 14. Front pivot link 48 is adapted to pivot with respect to seat base 14 about a generally linear axis 56 that is generally concentric with fastener 54. The term fastener, as used herein, may comprise a pin, shaft, bolt, rivet, rod, axle or the like. Second end 52 of front pivot link 48 is pivotably coupled to front leg 34 of pivot bracket 30 by a fastener 60 that extends through an aperture in second end 52 of front pivot link 48 and into aperture 36 of pivot bracket 30. Front pivot link 48 is adapted to pivot with respect to pivot bracket 30 about a generally linear axis 62 that extends generally concentrically through fastener 60 and that is generally parallel to axis 56 and generally transverse to seat base 14.

Linkage system 28 includes rear pivot links 66A and 66B that are generally parallel to one another. Rear pivot link 66A is generally curved and extends between a first end 68 and a second end 70. First end 68 of rear pivot link 66A includes an aperture 72A and second end 70 of rear pivot link 66B includes an aperture 72B. Rear pivot link 66B extends between a first end 74 and a second end 76 in the same generally curved manner as rear pivot link 66A. First end 74 of rear pivot link 66B includes an aperture 78A and second end 76 of rear pivot link 66B includes an aperture 78B. Apertures 72A and 78A are coaxially aligned with one another and apertures 72B and 78B are coaxially aligned with one another. Rear pivot link 66B includes a tab 80 that extends transversely and outwardly from a front edge of rear pivot link 66B toward rear pivot link 66A. Tab 80 is located generally midway between first end 74 and second end 76 of rear pivot link 66B. Rear pivot link 66B also includes a tab 82 at first end 74 that extends transversely and outwardly away from rear pivot link 66A. Tab 82 is located on the front edge of rear pivot link 66B.

First end 68 of rear pivot link 66A and first end 74 of rear pivot link 66B are pivotably attached to seat base 14 by a fastener 84. Fastener 84 extends through aperture 72A in first end 68 of rear pivot link 66A, through aperture 78A in first end 74 of rear pivot link 66B, and into aperture 22B of seat base 14. Rear pivot links 66A and 66B are conjointly pivotable with respect to seat base 14 about a generally linear axis 86 that extends generally concentrically through fastener 84 and apertures 72A, 78A and 22B. Second end 70 of rear pivot link 66A and second end 76 of rear pivot link 66B are pivotably coupled to pivot bracket 30 by a fastener 88 that extends through aperture 72B in second end 70 of rear pivot link 66A, through aperture 78B in second end 76 of rear pivot link 66B, and into aperture 42 in pivot bracket 30. Rear pivot links 66A and 66B are pivotable with respect to pivot bracket 30 about a generally linear axis 90 that extends generally concentrically through fastener 88, and apertures 72B, 78B and 42. Axis 90 is spaced apart from and generally parallel to axis 86. Axes 86 and 90 are generally parallel to axes 56 and 62.

Linkage system 28 includes a strut 96 as shown in FIG. 1 that extends generally linearly between a first end 98 and a second end 100. First end 98 of strut 96 is pivotably coupled to seat base 14 by a fastener that extends into aperture 22D of seat base 14 such that strut 96 is pivotable with respect to seat base 14 about a generally linear axis 102 that extends through first end of strut 96 and aperture 22D of seat base 14. Second end 100 of strut 96 is pivotably coupled to a front end of seat bottom 18 of seat 16 for pivotable movement with respect to seat bottom 18 about a generally linear axis 104. Axes 102 and 104 are spaced apart and generally parallel to one another and are generally parallel to axes 56, 62, 86 and 90.

Seat locking system 10 includes a lock 110 rigidly coupled to seat base 14. Lock 110 includes a base 112 having spaced apart apertures 114A and 114B and an aperture 116. Lock 110 may comprise a generally planar plate. Lock 110 includes a locking member 118 coupled to an upper end of base 112. Locking member 118 of lock 110 includes a catch 120 located on a rear end of locking member 118. Catch 120 may comprise a generally concavely curved blocking surface. Locking member 118 of lock 110 also includes a retention member 122. Retention member 122 may comprise a finger extending outwardly from a front end of locking member 118 to a tip 124. Locking member 118 includes a generally convexly curved guide surface 126 that extends along a top end of locking member 118 between a top end of catch 120 and tip 124 of retention member 122. Lock 110 includes a ledge 127 that extends rearwardly from a bottom end of catch 120.

A fastener 128 extends through aperture 114A in lock 110 and into aperture 22A in seat base 14 to rigidly couple lock 110 to seat base 14. Fastener 84 extends through aperture 78A in rear pivot link 66B, aperture 114B in lock 110, aperture 72A of rear pivot link 66A, and into aperture 22B of seat base 14. Fastener 84 rigidly couples lock 110 to seat base 14, while allowing rear pivot links 66A and 66B to pivot about pivot axis 86 with respect to seat base 14. A fastener 130 extends through aperture 116 in lock 110 and into an aperture in seat base 14 to rigidly couple lock 110 to seat base 14. Lock 110 is rigidly connected and fixed to seat base 14 by fasteners 84, 128 and 130.

Seat locking system 10 includes a locking pawl 140 pivotably coupled to second end 70 of rear pivot link 66A, second end 76 of rear pivot link 66B, and pivot bracket 30. Locking pawl 140 includes a base 142 having an aperture 144. Locking pawl 140 includes a front end including an abutment member 146. Abutment member 146 may comprise a generally convexly curved abutment surface. Abutment member 146 of locking pawl 140 and catch 120 of lock 110 are configured to generally matingly engage with one another. Locking pawl 140 includes a latch member 148 that extends outwardly from a bottom end of locking pawl 140. Latch member 148 may generally comprise a hook that forms a recess 150 adapted to releasably receive tip 124 of retention member 122 of lock 110. Locking pawl 140 includes an aperture 152 located generally between aperture 144 and abutment member 146. A tab 154 extends generally transversely and outwardly from the front end of locking pawl 140 adjacent a top end of abutment member 146 toward lock 110. An arm 156 having an aperture extends upwardly and outwardly from base 142 of locking pawl 140.

Fastener 88 extends through aperture 78B in second end 76 of rear pivot link 66B, aperture 144 in locking pawl 140, aperture 72B in second end 70 of rear pivot link 66A, and into aperture 42 in pivot bracket 30. Rear pivot links 66A and 66B are pivotably coupled to pivot bracket 30 by fastener 88 for pivotable movement about pivot axis 90. Locking pawl 140 is pivotably coupled to rear pivot links 66A and 66B and to pivot bracket 30 by fastener 88 for pivotable movement about pivot axis 90 with respect to rear pivot links 66A and 66B and pivot bracket 30 between a retracted unlocked position and an extended locked position.

Seat locking system 10 includes a cam 160 pivotably coupled to locking pawl 140. Cam 160 includes a base 162 having an aperture 164. Cam 160 includes an engagement member 166 at a front end that is adapted to releasably engage catch 120 of lock 110. Cam 160 includes a tab 168 that extends outwardly from a top end of cam 160 toward locking pawl 140. Cam 160 is pivotably coupled to locking pawl 140 by a fastener 170 that extends through aperture 164 in cam 160 and aperture 152 in locking pawl 140 such that cam 160 is pivotable with respect to locking pawl 140 about a pivot axis 172. Pivot axis 172 is spaced apart from and generally parallel to axis 90.

A resilient biasing member 180, such as for example a coil spring, has opposing ends respectively coupled to tab 154 of locking pawl 140 and tab 80 of rear pivot link 66B. A resilient biasing member 182, such as for example a coil spring, has opposing ends coupled to tab 154 of locking pawl 140 and tab 168 of cam 160. An actuator member 184, such as a elongate cord or cable, is coupled to arm 156 of locking pawl 140. While a single seat locking system 10 is described herein, one or more seat locking systems may be used in connection with a vehicle seat in conjunction with one another.

When seat 16 of vehicle seat 12 is in the retracted position as shown in solid lines in FIG. 1, biasing member 180 resiliently biases locking pawl 140 to pivot about pivot axis 90 in a generally clockwise direction as viewed in FIG. 1 with respect to rear pivot links 66A-B until abutment member 146 of locking pawl 140 is located within and adjacent to catch 120 of lock 110 and latch member 148 of locking pawl 140 engages ledge 127 of lock 110 wherein locking pawl 140 is in the extended locked position. Abutment member 146 of locking pawl 140 is adapted to engage the blocking surface of catch 120 of lock 110 to prevent pivotable movement of seat 16 from the retracted position to the extended position and thereby lock seat 16 in the retracted position.

A small gap may be present between abutment member 146 of locking pawl 140 and the blocking surface of catch 120 of lock 110 when seat 16 is in the retracted position, and locking pawl 140 is in the locked position, to enable relatively effortless pivotable movement of locking pawl 140 about pivot axis 90 between the extended locked position of locking pawl 140 and the retracted unlocked position of locking pawl 140 without interference of the pivotable movement by engagement of locking pawl 140 with catch 120 of lock 110.

When seat 16 is in the retracted position and locking pawl 140 is in the extended locked position, with abutment member 146 received in catch 120 of lock 110, biasing member 182 resiliently biases cam 160 to rotate in a generally clockwise direction as viewed in FIG. 1 about pivot axis 172 from a retracted unlocked position to an extended locked position. When cam 160 is in the extended locked position and locking pawl 140 is in the extended locked positon, with abutment member 146 received in catch 120 of lock 110, biasing member 182 biases engagement member 166 of cam 160 into engagement with catch 120 of lock 110. Cam 160 prevents pivotable movement of seat 16 from the retracted position toward the extended position due to engagement of engagement member 166 of cam 160 with catch 120 of lock 110. To the extent there may be room for some play or small movement of seat 16 from the retracted position toward the extended position due to a gap between abutment member 146 of locking pawl 140 and catch 120 of lock 110, the direct engagement of engagement member 166 of cam 160 with catch 120 of lock 110 prevents pivotable movement or vibration of seat 16 that may otherwise be enabled by a gap between abutment member 146 of locking pawl 140 and catch 120 of lock 110.

Should the vehicle become involved in a crash, high impact forces may be applied to seat 16. Such high impact forces may potentially displace cam 160 from engagement with catch 120 of lock 110. However, abutment member 146 of locking pawl 140 will engage catch 120 of lock 110 to lock seat 16 in the retracted position and prevent pivotable movement of seat 16 from the retracted position toward the extended position of seat 16.

When it is desired to pivot seat 16 from the retracted position as shown in FIG. 2 to the extended position as shown in FIG. 5, an upward retraction force is applied to arm 156 of locking pawl 140 by actuator member 184. Actuator member 184 pivots locking pawl 140 in a generally counter-clockwise direction about pivot axis 90 as viewed in FIG. 1 to a retracted unlocked position wherein abutment member 146 of locking pawl 140 is removed from catch 120 of lock 110 as shown in FIG. 3. Cam 160 conjointly pivots with locking pawl 140 out of engagement with catch 120 of lock 110 to a retracted unlocked position as locking pawl 140 is pivoted counter-clockwise about pivot axis 90.

Linkage system 28 then provides for pivotable movement of seat 16 from the retracted position as shown in FIG. 2 toward the extended position as shown in FIG. 5. As shown in FIG. 3, when seat 16 is initially pivoted from the retracted position, the retraction force applied by actuator member 184 to locking pawl 140 may be released such that biasing member 180 will resiliently bias latch member 148 of locking pawl 140 into engagement with guide surface 126 of lock 110. As seat 16 continues to be pivoted from the retracted position toward the extended position as illustrated in FIGS. 3 and 4, latch member 148 of locking pawl 140 will slide along guide surface 126 of lock 110.

When seat 16 reaches the extended position as generally illustrated in FIG. 5, biasing member 180 resiliently pivots locking pawl 140 in a generally clockwise direction about pivot axis 90 to the extended locked position wherein retention member 122 of lock 110 is received and located within recess 150 of latch member 148 of locking pawl 140. Latch member 148 of locking pawl 140 is adapted to engage retention member 122 of lock 110 to thereby lock seat 16 in the extended position and to prevent pivotable movement of seat 16 from the extended position toward the retracted position of seat 16.

Seat 16 may be selectively pivoted from the extended position as shown in FIG. 5 to the retracted position as shown in FIG. 2 by applying an upward retraction force to arm 156 of locking pawl 140 by actuator member 184, such that locking pawl 140 is pivoted in a counter-clockwise direction about pivot axis 90 from the extended locked position to the retracted unlocked position wherein latch member 148 of locking pawl 140 is disengaged from retention member 122 of lock 110. Seat 16 may then be pivoted from the extended position toward the retracted position, wherein the retraction force applied by actuator member 184 may be released, and such that biasing member 180 will resiliently bias latch member 148 of locking pawl 140 into sliding engagement with guide surface 126 of lock 110 until seat 16 is moved to the retracted position.

When seat 16 is sufficiently pivoted to reach the retracted position, biasing member 180 resiliently pivots locking pawl 140 in a clockwise direction about pivot axis 90 from the retracted unlocked position to the extended locked position wherein abutment member 146 of locking pawl 140 is received within and is located adjacent to catch 120 of lock 110, and biasing member 182 resiliently pivots cam 160 in a clockwise direction about pivot axis 172, such that engagement member 166 of cam 160 is in engagement with catch 120 of lock 110. Seat 16 is thereby releasably locked against pivotal movement from the retracted position toward the extended position of seat 16.

The invention claimed is:

1. A seat locking system for a seat pivotably coupled to a seat base, the seat being selectively pivotable with respect to the seat base between a retracted position and an extended position, the seat locking system comprising:
    a lock adapted to be coupled to the seat base, the lock including a catch and a retention member, and
    a locking pawl adapted to be pivotably coupled to the seat, the locking pawl including an abutment member and a latch member, the locking pawl being pivotable between a locked position and an unlocked position with respect to the seat,
    wherein when the seat is in the retracted position and the locking pawl is in the locked position the abutment member of the locking pawl is adapted to engage the catch of the lock such that the locking pawl prevents the seat from moving to the extended position, and when the seat is in the extended position and the locking pawl is in locked position the latch member of the locking pawl is adapted to engage the retention member of the lock such that the locking pawl prevents movement of the seat from the extended position to the retracted position, the seat being selectively pivotable between the retracted position and the extended position when the locking pawl is in the unlocked position.

2. The seat locking system of claim 1, wherein the catch of the lock comprises a blocking surface.

3. The seat locking system of claim 2, wherein the blocking surface of the catch is generally concavely curved.

4. The seat locking system of claim 1, wherein the retention member of the lock comprises an outwardly extending finger adapted to be engaged by the catch of the locking pawl when the seat is in the extended position and the locking pawl is in the locked position.

5. The seat locking system of claim 1, wherein the abutment member of the locking pawl comprises a generally convexly curved abutment surface.

6. The seat locking system of claim 1, wherein the latch member of the locking pawl comprises a hook adapted to receive the retention member of the lock when the seat is in the extended position and the locking pawl is in the locked position.

7. The seat locking system of claim 1, wherein the lock includes a convexly curved guide surface located between the catch and the retention member, the locking pawl adapted to slidably engage the guide surface when the locking pawl is in the unlocked position.

8. The seat locking system of claim 1, including a cam pivotably coupled to the locking pawl, the cam being selectively pivotable between a locked position and an unlocked position, the cam adapted to engage the catch of the lock when the seat is in the retracted position and the locking pawl is in the locked position.

9. The seat locking system of claim 8, including a biasing member having a first end coupled to the locking pawl and a second end coupled to the cam.

10. The seat locking system of claim 1, including a linkage system pivotably coupling the seat to the seat base.

11. The seat locking system of claim 10, including a biasing member having a first end coupled to the locking pawl and a second end coupled to the linkage system.

12. The seat locking system of claim 10, wherein the linkage system includes a pivot bracket coupled to the seat, and a plurality of links pivotably coupled to the pivot bracket and pivotably coupled to the seat base.

13. The seat locking system of claim 12, wherein the pivot bracket includes a leg adapted to engage a stop surface of eh seat base when the seat is in the retracted position.

* * * * *